(12) United States Patent
Roehrl et al.

(10) Patent No.: US 10,023,059 B2
(45) Date of Patent: Jul. 17, 2018

(54) WIRELESS CHARGING FOR VEHICLE BATTERIES

(71) Applicant: Continental Automotive GmbH, Hannover (DE)

(72) Inventors: Thomas Roehrl, Barbing (DE); Martin Boeld, Regensburg (DE); Joris Fokkelman, Tegernheim (DE); Karsten Hofmann, Pettendorf (DE); Mael Thevenet, Regensburg (DE); Christoph Weigand, Regensburg (DE); Stephan Bartz, Regensburg (DE)

(73) Assignee: CONTINENTAL AUTOMOTIVE GMBH, Hanover (DE)

( * ) Notice: Subject to any disclaimer, the term of this patent is extended or adjusted under 35 U.S.C. 154(b) by 0 days.

(21) Appl. No.: 15/107,793

(22) PCT Filed: Dec. 11, 2014

(86) PCT No.: PCT/EP2014/077460
§ 371 (c)(1),
(2) Date: Jun. 23, 2016

(87) PCT Pub. No.: WO2015/096997
PCT Pub. Date: Jul. 2, 2015

(65) Prior Publication Data
US 2016/0318413 A1    Nov. 3, 2016

(30) Foreign Application Priority Data
Dec. 23, 2013 (DE) .......................... 10 2013 227 129

(51) Int. Cl.
*H02J 7/00* (2006.01)
*B60L 11/18* (2006.01)
(Continued)

(52) U.S. Cl.
CPC ......... *B60L 11/1829* (2013.01); *B60L 11/182* (2013.01); *B60L 11/1831* (2013.01);
(Continued)

(58) Field of Classification Search
CPC ... Y02T 90/14; Y02T 10/7005; Y02T 90/128; Y02T 10/7088; Y02T 90/163
(Continued)

(56) References Cited

U.S. PATENT DOCUMENTS

| 6,865,455 B1 | 3/2005 | Wiegert | 701/23 |
| 8,513,915 B2 | 8/2013 | Patel | 320/108 |

(Continued)

FOREIGN PATENT DOCUMENTS

| DE | 19816762 A1 | 10/1999 | B60L 5/00 |
| DE | 102010012356 A1 | 9/2011 | B60L 9/00 |

(Continued)

OTHER PUBLICATIONS

German Office Action, Application No. 102013227129.8, 9 pages, dated Oct. 13, 2014.
(Continued)

*Primary Examiner* — Arun Williams
(74) *Attorney, Agent, or Firm* — Slayden Grubert Beard PLLC

(57) ABSTRACT

The present disclosure relates to automobiles and, more specifically, teaches methods and systems that may be used for wirelessly charging batteries used in vehicles. In one embodiment, a method for detecting a relative position between a vehicle-side receiving charging coil and a fixed transmission charging coil, may include: generating an alternating magnetic orientation field using one of the coils; detecting the orientation field using at least one coil provided for inductive excitation, wherein the orientation field is detected in a frequency-selective manner by the at least
(Continued)

one coil; and ascertaining the relative position using an orientation receiving signal induced by the orientation field in the at least one coil.

18 Claims, 3 Drawing Sheets

(51) Int. Cl.
*H02J 50/60* (2016.01)
*H02J 50/80* (2016.01)
*H02J 50/12* (2016.01)
*H02J 7/02* (2016.01)
*H02J 50/90* (2016.01)
*H02J 50/10* (2016.01)

(52) U.S. Cl.
CPC ............ *B60L 11/1833* (2013.01); *H02J 7/025* (2013.01); *H02J 50/10* (2016.02); *H02J 50/12* (2016.02); *H02J 50/60* (2016.02); *H02J 50/80* (2016.02); *H02J 50/90* (2016.02); *Y02T 10/7005* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/14* (2013.01)

(58) Field of Classification Search
USPC ........................................................ 320/109
See application file for complete search history.

(56) References Cited

U.S. PATENT DOCUMENTS

| | | | | |
|---|---|---|---|---|
| 2009/0079388 A1* | 3/2009 | Reddy | ................ | B60L 11/1818 320/109 |
| 2009/0091868 A1* | 4/2009 | Trenchs | ............... | B60L 3/0046 361/42 |
| 2010/0277121 A1* | 11/2010 | Hall | ...................... | B60L 11/182 320/108 |
| 2010/0289496 A1 | 11/2010 | Cole et al. | .................... | 324/343 |
| 2011/0254503 A1 | 10/2011 | Widmer et al. | ................ | 320/108 |
| 2012/0043931 A1* | 2/2012 | Terao | ...................... | H02J 7/025 320/108 |
| 2012/0262002 A1 | 10/2012 | Widmer et al. | ................ | 307/104 |
| 2013/0029595 A1* | 1/2013 | Widmer | ............... | H04B 5/0031 455/39 |
| 2013/0033224 A1 | 2/2013 | Raedy | ........................... | 320/107 |
| 2014/0174870 A1* | 6/2014 | Niizuma | ................. | H02J 5/005 191/10 |
| 2014/0217966 A1* | 8/2014 | Schneider | ............. | B60L 11/182 320/108 |
| 2014/0239735 A1 | 8/2014 | Abe et al. | ...................... | 307/104 |
| 2014/0266183 A1* | 9/2014 | Nishida | .................. | H01L 43/04 324/251 |
| 2015/0151641 A1 | 6/2015 | Berger et al. | .................. | 320/108 |

FOREIGN PATENT DOCUMENTS

| | | | | |
|---|---|---|---|---|
| DE | 102010042395 A1 | 4/2012 | ............. | H02J 17/00 |
| DE | 102011116321 A1 | 5/2012 | ............. | B60L 11/18 |
| DE | 102012214199 A1 | 4/2014 | ............. | B60L 11/18 |
| EP | 1061631 A1 | 12/2000 | ............. | B60L 11/18 |
| WO | 2013/035853 A1 | 3/2013 | ............. | B60L 11/18 |
| WO | 2015/096997 A1 | 7/2015 | ............. | B60L 11/18 |

OTHER PUBLICATIONS

International Search Report and Written Opinion, Application No. PCT/EP2014/077460, 20 pages, dated Apr. 9, 2015.

German Office Action, Application No. 102013227129.8, 9 pages, dated Apr. 30, 2015.

Chinese Office Action, Application No. 201480070575.9, 10 pages, dated Nov. 30, 2017.

* cited by examiner

WIRELESS CHARGING FOR VEHICLE BATTERIES

CROSS-REFERENCE TO RELATED APPLICATIONS

This application is a U.S. National Stage Application of International Application No. PCT/EP2014/077460 filed Dec. 11, 2014, which designates the United States of America, and claims priority to DE Application No. 10 2013 227 129.8 filed Dec. 23, 2013, the contents of which are hereby incorporated by reference in their entirety.

TECHNICAL FIELD

The present disclosure relates to automobiles and, more specifically, teaches methods and systems that may be used for wirelessly charging batteries used in vehicles.

BACKGROUND

In electric vehicles and hybrid vehicles, a battery is used for traction power generation. Other motor vehicles require an on-board battery for operation. It is often necessary to transmit electric power from an external power source to the vehicle. Wired solutions (so-called plug-in solutions) are already known, in which an electric plug-in contact and an associated feed line are used for connecting an external stationary power source to the vehicle in order to charge its battery. Further more convenient solutions are known, where electric power is transmitted from a stationary coil (called transmission charging coil from now on) to a vehicle-side coil by an alternating magnetic field, wherein the vehicle-side coil serves as receiving charging coil.

When taking a general look at the stray field losses in this wireless transmission system there arises the desire to design the transfer of power with a maximum degree of efficiency in order to reduce the stray field to an absolute minimum.

SUMMARY

The teachings of the present disclosure may provide an approach with which it is possible in a simple way to detect the relative positioning between transmission charging coil and receiving charging coil, in order to be able to align these coils relative to each other.

Some embodiments of the present teachings include a method for detecting a relative position between a vehicle-side receiving charging coil and a fixed transmission charging coil (110). The method may include generating an alternating magnetic orientation field (100) using one of these coils and detecting the orientation field using at least one coil (122a-126c) provided for inductive excitation. The orientation field (100) may be detected in a frequency-selective manner by the coil provided for inductive excitation, and ascertaining the relative position using an orientation receiving signal, which is induced by the orientation field in the at least one coil provided for inductive excitation.

In some embodiments, the at least one coil provided for inductive excitation is provided in a resonance circuit (10, 12), the resonance frequency of which corresponds to a frequency of the orientation field, or the orientation receiving signal is directed through a filter which comprises a passing frequency range, within which the frequency of the orientation field lies.

In some embodiments, the orientation field (100) is generated by the transmission charging coil and the at least one coil provided for inductive excitation detects the orientation field (100) on the vehicle side, or the orientation field (100) is generated by the vehicle-side receiving charging coil and the coil (122a-126c) provided for inductive excitation detects the orientation field (100) in a fixed position.

In some embodiments, detecting the orientation field (100) is carried out using at least one vehicle-side or fixed sensor coil (122a-126c) as the coil provided for inductive excitation, or using the transmission charging coil or receiving charging coil as the coil provided for inductive excitation.

In some embodiments, the vehicle, the receiving charging coil, or the transmission charging coil is aligned in a predefined optimal relative position, wherein the relative position is repeatedly ascertained during alignment, and electric power is transmitted via an alternating magnetic charge field from the transmission charging coil (110) to the receiving charging coil.

In some embodiments, the orientation field and the charge field are generated using the transmission charging coil. The transmission charging coil (110) generates the orientation field (100) at a first power level, until the at least one coil provided for inductive excitation starts to detect the orientation field. The transmission charging coil (110) works with less power than the first power level while alignment takes place and after the coil provided for inductive excitation has started to detect the orientation field (100). The charge field is generated by the transmission charging coil (110) at a second power level which lies above the first level, when the optimal relative position is achieved through alignment.

In some embodiments, the orientation field (100) can have a spatial scatter different from that of the charge field.

In some embodiments, during detecting, during aligning and/or during charging the coil provided for inductive excitation and in particular at least one sensor coil (122a-126c) emits a signal, which is examined for discontinuities, or the orientation receiving signal is examined for discontinuities, and when a discontinuity occurs a signal is emitted, which points to a foreign body.

In some embodiments, the orientation field (100) is modulated with an identification signal, which identifies the transmission charging coil.

Some embodiments may include an orientation signal receiver (4) with at least one coil (10) provided for inductive excitation in the form of at least one vehicle-side or fixed sensor coil (122a-126c), wherein the orientation signal receiver further comprises a receiving device (2), which is connected to the at least one sensor coil (10).

In some embodiments, the receiving device (2) is frequency-selective and is configured to receive an orientation receiving signal from the at least one coil provided for inductive excitation.

In some embodiments, the orientation signal receiver comprises at least one resonance circuit (10, 12), which comprises the sensor coil as well as a capacity connected thereto, of the frequency-selective receiving device (2)

In some embodiments, the frequency-selective receiving device (4) comprises a filter (14) comprising a passing range, in which a frequency of the orientation field lies, which is adapted to induce the orientation receiving signal in the sensor coil.

In some embodiments, the orientation signal receiver is provided with a plurality of sensor coils (422-426), wherein the sensor coils (422-426) are arranged so as to be inclined towards each other.

Some embodiments include an inductive charging device for a vehicle with an orientation signal receiver described above. The charging device further comprises a position calculating device (30) arranged downstream of the receiving device (2) and adapted to ascertain a relative position between the vehicle and a fixed transmission charging coil using the orientation receiving signal of the receiving device (2) and an alignment signal generator arranged downstream of the position calculating device (30) and adapted to generate an alignment signal using the relative position of the position calculating device (30), which signal is configured to be displayed by means of an optical display (40) or by means of an acoustic or haptic transducer and/or to activate a positioning mechanism (50) of the receiving charging coil or the transmission charging coil.

Some embodiments include a foreign body detection device (60) arranged downstream of the orientation signal receiver (4) and adapted to ascertain discontinuities in the orientation receiving signal of the receiving device, wherein an error generator of the foreign body detection device (60) is adapted to emit an error condition signal, if discontinuities are present in the orientation receiving signal.

DETAILED DESCRIPTION

Figure 1:
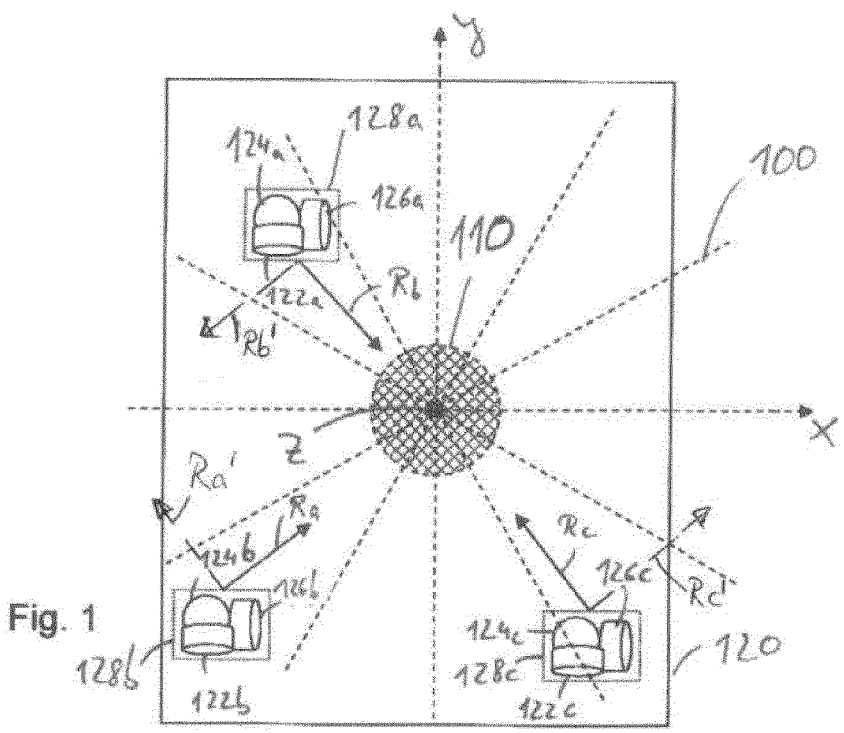
FIGS. 1-3 each show an example orientation field and sensor coils for explaining various possibilities for calculating a relative position.

A relative position between a receiving charging coil and a transmission charging coil can be detected by observing a magnetic orientation field, using a type of sensor is used which can detect only alternating magnetic fields and which remains unaffected by static magnetic fields. Due to the fact that the type of sensor used for detecting the orientation field remains unaffected by static magnetic fields, the signal used for detection does not suffer interference from static magnetic fields, which occur, in particular, in buildings with reinforced concrete walls or in parking spaces from steel (for example multiplex car parks). As a result, the signal is not distorted due to non-linearities or due to overriding a magnetic field sensor, so that the precision of the orientation is increased.

As sensor type, therefore, coils are used which in principle remain unaffected by stationary magnetic fields so that by using a coil for detecting the orientation field per se, a frequency selectivity occurs in terms of a high-pass or a band-pass. Provision is made for the orientation field to be detected frequency-selectively by a coil, wherein the coil, in particular because it is bound into a resonance circuit, or because of an (analog or digital) filter arranged downstream of the coil, detects only part of the alternating signal spectrum. The orientation field may therefore comprise a frequency component which lies within that frequency spectrum which is detected by the frequency-selective coil so that even interfering alternating signal components, during detection of the orientation field, remain essentially disregarded. In other words, the sensitive frequency range (passing range) or the resonance frequency of the frequency-selective coil can be adapted to the spectrum/the frequency components or the frequency of the orientation field.

At least one sensor coil may be used in addition to a transmission charging coil and a receiving charging coil for detecting the orientation field. Since it is an inherent property of a coil such as a sensor coil to be excited only by magnetic alternating fields and to remain unaffected by static magnetic fields, an immunity to noise from static magnetic fields, such as occurring in reinforced concrete buildings or in car parks constructed from steel (e.g., in multiplex car parks), results solely through the use of a sensor coil.

A further advantage consists in that the coil used to detect the orientation field may be designed independent of the requirements of the transmission charging coil and the receiving charging coil, wherein, in particular, by designing the sensor coil with a cross-sectional surface smaller than the cross-sectional surface of the transmission coil or the receiving coil a smaller size results. Due to the smaller size the space requirement is reduced and furthermore the influence from magnetic interference fields is reduced. The sensor coil may comprise an inductivity which is larger than the inductivity of the transmission charging coil and/or the receiving charging coil. The inductivity of the sensor coil may be at least 2 times, 5 times, 10 times, 50 times or 100 times greater than the inductivity of the transmission charging coil and/or the receiving charging coil in order to permit high sensitivity in case of large distances to the center of the orientation field. In some embodiments, adjustable attenuation for the receive signal of the sensor coil is therefore provided in order not to overload signal processing components (such as filters, amplifiers and similar) arranged downstream of the sensor coil, in the event of lesser distances and therefore high detected orientation field strengths. Moreover, the sensor coil may be placed on the vehicle at a location other than the receiving coil, wherein a number of sensor coils are placed at different locations on the vehicle in order to be able to efficiently detect the orientation field. As such the sensors could, for example, be attached to the periphery of the vehicle and could therefore detect the measurement signal particularly early and sensitively. At the same time the coil's inherent property of remaining essentially unaffected by stationary magnetic fields serves to provide immunity to noise from stationary magnetic fields, such as can be generated by steel components in buildings or by direct current charging devices.

Some embodiments may include a method for detecting a relative position between a vehicle-side receiving charging coil and a fixed transmission charging coil. The vehicle-side receiving charging coil may be attached to or fitted into, an underside of the vehicle. The receiving charging coil can be directly attached or connected to the vehicle via a positioning mechanism. The stationary transmission charging coil is connected fixedly or via a positioning means, to the floor of a parking space, or alternatively may be placed on the floor and/or the parking space. A fixed or stationary transmission charging coil is a transmission charging coil which is not carried along by the vehicle, but which is usually found on or, at least partially, in a floor, above which the vehicle can be positioned. By floor is understood a concrete floor, an asphalt floor or a reinforced concrete floor of a building (of a car park) or further a metal floor of a parking space, in particular a multiplex car park and/or a park lift. The receiving charging coil and/or transmission charging coil may be respectively provided as a single coil or as a coil with a number of coil sections which may be offset relative to one another. In some examples, the receiving charging coil and/or transmission charging coil may comprise a magnetic core. The receiving charging coil and/or the transmission charging coil may further be provided with a power control circuit.

An alternating magnetic orientation field is generated using one of these coils, for example, the transmission charging coil. The orientation field, as regards frequency and/or field strength, may correspond to a charge field, with which the transmission charging coil transmits power to the receiving charging coil in a position mode. The power, the frequency and/or the field form of the orientation field may deviate from that of the charge field. In particular, the orientation field has a lesser field strength and/or power than the charge field. The field strength or the power of the orientation field, for example, may be no more than 50%, 20%, 10%, 1%, 0.5% or 0.1% of the field strength or the power of the charge field. For example, the orientation field may be generated by means of a power of no more than 50, 20, 10, 5 or 2 watts. The charge field may be operated with a power of at least 1 kW, at least 2 kW, at least 3 kW or at least 5 kW (this power indicates the power transmitted from the transmission charging coil to the receiving charging coil).

The orientation field is detected using at least one coil provided for inductive excitation. Detection is thus effected with a coil which is connected such that an orientation receiving signal generated in the coil can be tapped or is fed to a receiving device (or its input). The coil provided for inductive excitation may thus be a receiving charging coil which comprises a tap which is connected with a receiving device, which processes the signal generated by the coil in regard to the relative position between receiving charging coil and transmission charging coil. This receiving unit is different from a power circuit which serves the transmission of power from the receiving charging coil to a battery or to an onboard power system. Furthermore, the coil provided for inductive excitation may be the transmission charging coil which during detection of the orientation field is preferably not acted upon by current.

In particular, the coil provided for inductive excitation may be a sensor coil which is neither identical to the transmission charging coil nor identical to the receiving charging coil.

Therefore, the orientation field can be generated by means of the transmission charging coil, while the orientation field is detected by means of the receiving charging coil or (at least) a sensor coil. Further the orientation field can be generated by means of the receiving charging coil, while the transmission charging coil or the sensor coil detects the orientation field. Moreover it is possible to use a coil such as the sensor coil for generating the orientation field, while the transmission charging coil and/or the receiving charging coil detect the orientation field. In the latter case the coil used to generate the orientation field may be configured like a sensor coil and further may be provided on the vehicle side or as a stationary coil.

The orientation field is detected by the coil, which is provided for inductive excitation, in a frequency-selective manner. As already mentioned the coil provided for inductive excitation detects only a part of the frequency spectrum of the magnetic field in order to block out control influences from alternating magnetic fields. To this end the coil itself may be provided in a frequency-selective receiving circuit or a filter may be arranged downstream of the coil, which filter is frequency-selective. Ways of how the coil can be designed in a frequency-selective manner and/or can detect in a frequency-selective manner are revealed in the description and in particular in the description of the figures.

Finally the relative position is ascertained using the orientation field, which is detected by the coil provided for inductive excitation. Provision is made for the relative position to be ascertained using an orientation receiving signal, which is emitted by the coil provided for inductive excitation. In particular the relative position is ascertained using an orientation receiving signal, which is induced by the orientation field in the coil which is provided for inductive excitation. Further details for ascertaining the relative position using the orientation receiving signal are given further below. The relative position is understood, in particular, to be the distance between the receiving charging coil and the transmission charging coil, which may be linked to direction information, such as an angle or a coordinate tuple or a vector.

Furthermore, the at least one coil provided for inductive excitation may be provided in a resonance circuit. In this case for example (at least) one capacitor may be connected in parallel or in series with the coil. The resonance circuit comprises a resonance frequency which corresponds to a frequency of the orientation field. The resonance frequency may lie within a spectrum of the orientation field, which comprises at least 30, 50, 80, 70 or 90% of the field strength and/or the power of the orientation field. The resonance frequency of the resonance circuit corresponds to a frequency or frequency component of the orientation field, which is at least 20%, 50%, 80%, 90% or 95% of the total field strength or total power of the orientation field.

The resonance frequency is thus adjusted to match the basic frequency of the orientation field.

Alternatively, or in combination with the design of a resonance circuit, the orientation receiving signal induced by the orientation field in the respective coil is directed through a filter. This filter comprises a passing frequency range, within which the frequency and/or the frequency spectrum of the orientation field lies. At least 50, 80, 90 or 95% of the power of the orientation receiving signal falls within the passing frequency range. The passing frequency range is limited by cutoff frequencies at which the passing function of the filter drops to one half, one tenth, one hundredth or one thousandth of the maximum of the passing function.

In other words, provision may be made for the orientation field to be frequency-coded, wherein the orientation field is detected by means of a detection device, of which the frequency-selective sensitivity is adapted to match the frequency of the orientation field. Furthermore, it is possible for the orientation field to be amplitude-modulated, phase-modulated or frequency-modulated in order to separate the orientation field from interfering signals. Furthermore, the orientation field may be folded with a code, such as a ternary or binary code. In this case the orientation receiving signal is received in accordance with the modulation of amplitude, frequency or code. Also, matched filters, phase-locked loops or correlation receivers may be used for detecting/processing the orientation field. In particular, the orientation field may be phase-modulated, wherein the orientation receiving signal is detected by a PSK receiver (PSK=phase shift keying, phase modulation) or the orientation field may be modulated with an OFDM signal (OFDM=orthogonal frequency multiplexing procedure). Detecting the orientation field is performed using the respective phase modulation or OFDM receiving procedures.

Modulation of the orientation field (amplitude, frequency, phase, code and/or OFDM modulation) may be individual and, in particular, comprise information on the identity of the coil generating the orientation field (e.g., the transmission charging coil), information on the power of the coil generating the orientation field, information on the service provider operating the transmission charging coil or the supply network connected thereto, information on the type of charging, information on a type of communication for the communication between vehicle and control unit arranged upstream of the transmission charging coil and/or information on the position of the charging coil within the parking space. In particular modulation may reflect information on the current relative position between transmission coil and receiving coil. The relative position is ascertained using the amplitude of the orientation receiving signal or the amplitudes of the orientation receiving signals, in case a number of coils provided for inductive excitation are used. In this case use is made, in particular, of ratios of orientation receiving signals from a number of coils (in particular the sensor coil) adapted to receive the orientation field, in order to determine the relative position. These coils may be provided at a distance from each other.

The relative position may also be ascertained by a field direction resulting from a number of orientation receiving signals or may be ascertained using a combination of amplitudes (e.g., the signal strength) of the orientation receiving signals when using a number of coils provided for inductive excitation. The field direction is ascertained from orientation receiving signals of a number of coils provided for inductive excitation, which are inclined towards each other and/or are differently orientated. These coils may be provided at the same location. A number of groups of differently orientated coils may be provided in which an orientation receiving signal is generated, wherein the groups are provided at different locations. Using the known spatial relationships of the locations and using the respective field directions, which are ascertained for a number of groups using the orientation receiving signals, the relative position can be ascertained as two-dimensional or multi-dimensional location information.

Any additional information from the modulation of the orientation field is preferably used in addition to the described determination of the relative position. In particular provision is made, when ascertaining the relative position, for evaluating the power of the orientation receiving signal or of a number of orientation receiving signals. To this end the transient power values can be set in relation to each other or can be standardized, or detected power values of the orientation receiving signal are used, which were recorded at substantially the same point in time. These are mapped onto the relative position by means of an image, wherein the image assigns a number of ratios of power or amplitude values of the orientation receiving signals to respective relative positions.

The image may be a mathematical image in the form of a formula, or may be provided as a look-up table. In this case the orientation receiving signals (standardized and/or as ratios of receive signals) can be compared to entries in a look-up table in order, in particular, to ascertain the entries which best match. Here the look-up table maps signal strength values or ratios therefrom onto respectively a relative position, such that the relative position can be determined on the basis of the orientation receiving signals, using the look-up table.

Alternatively, the field direction is ascertained using the orientation receiving signals. An image implemented in particular by a function or by a look-up table maps the direction (and the power as required) onto positions relative to the orientation field and in particular to the center of the orientation field. The function and/or the look-up table may reflect triangulation relationships, wherein several directions of the orientation field are used at different locations according to a triangulation procedure for calculating a relative position. Ascertaining the relative position using the at least one orientation receiving signal is discussed in detail in particular by means of the figures.

In some embodiments, the orientation field is generated by the transmission charging coil, wherein the at least one coil provided for inductive excitation detects the orientation field on the vehicle side. Here the coil provided for inductive excitation is the receiving coil or at least a sensor coil. A further possibility consists in that the orientation field is generated by the vehicle-side receiving coil. Here the coil provided for inductive excitation detects the orientation field in a fixed position (i.e. stationary). With this possibility the coil provided for inductive excitation is the transmission coil or at least a stationary sensor coil.

The stationary sensor coil may be provided on the floor of the parking space or at least partially in the floor. Position data, field strength data, and/or amplitude data is transmitted by the coil provided for inductive excitation to the vehicle. Here a communications module may be arranged downstream of the coil provided for excitation, and/or is arranged downstream of a position calculating device, which is connected to the coil preferably via a receiving device. The last-mentioned embodiment may allow that when using at least one sensor coil it does not have to be arranged on the vehicle, but can be provided outside the vehicle and in particular as a stationary coil. The first-mentioned embodiment, on the other hand, may provide that a communication between the vehicle and a stationary unit is not necessarily mandatory.

In some embodiments, the coil provided for inductive excitation, in the form of the vehicle-side receiving coil or in the form of at least a sensor coil, is connected with a communications device either directly and/or via a position calculating device. The communications device is used for the transmission of power data or amplitude data of the orientation receiving signal or for the transmission of the already ascertained relative position, from the vehicle to the stationary coil. The stationary coil may be arranged on a positioning mechanism which, for optimal alignment of the receiving charging coil to the transmission charging coil, moves the transmission charging coil according to the relative position or according to the orientation receiving signal. The communications module may be a near-field communications module (designed according to an NFC standard), a communications module suitable for mobile radio transmission (in particular a GSM, UMTS, EDGE, GPRS, HSCSD, or LTE communications module), a WLAN communications module, a Bluetooth communications module, or a DECT communications module. Further the communications module may be based on a proprietary communications standard. The communications module may also be a radio module or a module for optical data transmission.

To detect the orientation field at least one sensor coil may be attached on the vehicle side or is stationary. The sensor coil forms here the coil provided for inductive excitation. Alternatively the orientation field may be detected by means of the transmission charging coil or by means of the receiving charging coil. The transmission charging coil or the receiving charging coil form the coil provided for inductive excitation here. In particular, only a section of the transmission charging coil or receiving charging coil may be used for detecting the orientation field, wherein the respective coil preferably comprises an appropriate winding tap.

In some embodiments, a number of vehicle-side or fixed sensor coils may be used for detecting the orientation field. These are distributed in particular on an underside of the vehicle and preferably at a distance of at least 5, 10, 20, 50, 100 or 120 centimeters.

In particular, three or four sensor coils are provided on the underside of the vehicle or as stationary transmission coils, in order to detect the orientation field with a number of sensor coils. The sensor coils may be arranged at a distance from each other as mentioned and/or with different orientations. If the orientation field is detected using a number of locally distributed sensor coils, the relative position can be detected in a precise manner.

In one embodiment one or more sensor coils are used which are arranged in particular as an array or as a matrix, and which are distanced from each other. The sensor coils may have identical or different orientations. The sensor coils may be arranged at identical distances in the array or in the matrix. The distances between the sensor coils do not necessarily however have to be the same. The sensor coils may be locally distributed in an irregular or asymmetrical manner. The distances/the position of the sensor coils are taken into account when the relative position is ascertained. Furthermore, the asymmetric or irregular local distribution of the sensor coils can be used for plausibility checks, in particular when the number of sensor coils exceeds the dimension of the relative position thus allowing redundant determinations of the relative position. These are used, in particular, in order to perform plausibility checks on the determination of locations and in particular in order to resolve a non-unequivocal triangulation resolve it by evaluating the redundant sensor coils (or their signals).

In some embodiments, a number of differently aligned sensor coils are used, which in particular can be localized at the same location. These sensor coils are called a group. A number of groups may be provided, which in particular are localized at different locations. For example, three coils arranged orthogonally to each other may be used as sensor coils, the centers of which essentially coincide with each other (i.e. with a deviation of preferably less than 10 cm, 5 cm, 2 cm or 1 cm).

Differently orientated sensor coils (e.g., N=3 sensor coils or an integral multiple of N) can be arranged relative to each other such that their axes intersect, with the axes each extending, section-wise, through an (imaginary) sphere with a diameter of less than 5, 2 or 1 cm.

In some embodiments, the sensor coils may be split into groups, wherein each group comprises three differently orientated coils, as stated above. The orientation receiving signal here is multi-dimensional, or a number of orientation receiving signals are present. The multi-dimensional orientation receiving signal or the orientation receiving signals comprises and/or comprise all individual receive signals of all sensor coils, wherein the signals are preferably grouped in accordance with the local grouping. 2, 3 or 4 groups of such sensor coils may be used. The groups are arranged in particular at a distance of at least 10 cm, 20 cm, 50 cm, 100 cm or 120 cm from each other. This makes it possible to detect, using each group of coils, the direction progression of the orientation field (e.g., the field direction), in particular in that the individual power values of the coils of one group (or the amplitude values) are considered as a direction vector, which indicates the direction of the orientation field for the location of the respective group.

If several such groups are used, each of which supplies an orientation field direction (even if ambiguous), it is possible to detect, by triangulation, the position of the sensor coil relative to the orientation field. In case the positioning/the orientation field direction is ambiguous, the unequivocal relative position can be ascertained by means of an existing redundant group and/or by means of a signal strength comparison of coils of different groups. For example, a combined total power of all orientation receiving signals of a group of coils can be combined (for example by a simple addition of the arguments or by amount formation, in particular by ascertaining the square root of the sum of the squares of arguments, the power values, or amplitudes), in order to ascertain in this way which of the groups lies closer to the center of the orientation field. With this approach the signal strengths may be compared, wherein the group lying closer to the center has a higher signal strength/amplitude.

It is possible to form ratios of signal strengths of the orientation receiving signals, wherein this applies, in particular, to orientation receiving signals of coils, the orientation direction of which extends essentially vertically or at least at an inclination of 45° to the longitudinal axis of the coil, which generates the orientation field. The field components of the orientation field, for which coils aligned in this way are more sensitive than other field components, fluctuate more strongly than field components in parallel to this longitudinal axis, wherein in particular the ratios from the distance to the center of the orientation field fluctuate strongly.

The dependency between the field strength of coils, which are at least 45° to the longitudinal axis of the orientation field generating coil, and the distance to the orientation field generating coil comprises in particular local minima or maxima. The ratio in particular is dependent on the distance in accordance with a non-monotonous dependency. The progression of the signal strengths or of the ratios can be ascertained depending on the path or the time, wherein this progression can be compared with a predefined progression (ascertained by way of the orientation field). If the comparison results in a high concordance at a certain coordinate, it is determined that the vehicle/the sensor coils is/are at this coordinate.

Furthermore, the signal strengths of the orientation receiving signals can be used to ascertain distances or distance lines to the respective coils. An image may be provided (e.g. as a function or a look-up table), which maps signal strengths onto a distance or a distance line. Generally the signal strengths are linked to the distances according to a monotonously falling function, wherein the greater the signal strength, the less the distance. Using the position of the coils in relation to each other, an intersection can thus be determined, which marks the origin of the orientation field. If the intersection ascertained is ambiguous, ratios of the signal strengths may be formed in order to resolve this ambiguity. Thus a number of coils, in particular 3, 4 or more sensor coils, may be present at different positions, wherein an image is provided, which maps the signal strength onto a distance line (an "Iso signal strength line").

One or more intersections of the distance lines of the sensor coils are formed, wherein for a number of intersections, signal strengths of differently positioned (and/or orientated) coils are compared, in order to draw conclusions as to which intersection is the relevant intersection. The intersection marks the origin of the orientation field. The relative position results from the spatial relationship between origin and position of the sensor coils. Preferably the coils provided at different locations are differently orientated or inclined towards each other. Since each coil comprises an anisotropic direction characteristic (e.g., one which deviates from a spherical radiator), the distance lines are not circles, but have a predefined progression, such as in the form of an eight. The direction characteristic is characterized by high sensitivity in a direction, which roughly corresponds to the longitudinal direction of the coil, and by a decreasing sensitivity with increasing angular deviation from the longitudinal direction, for example representable as a cosine function. The direction characteristic has a minimal sensitivity for a direction corresponding to a transverse axis of the coil and/or in a direction essentially vertical to the longitudinal axis.

With the graphic representation of the direction characteristic the shape of an eight with a constriction is obtained for a direction essentially vertical to the longitudinal axis of the coil. For the same signal strength of the orientation field receiving signal a large (maximum) distance is obtained in the longitudinal direction of the coil and a minimum distance is obtained vertically thereto with a progression as described for the direction characteristic.

Mapping the signal strength onto the distance corresponds to this anisotropic direction characteristic. In some embodiments, a number of coils or all coils are directed at an area between the coils. In order to avoid that the low sensitivity of the coils, for field progressions vertical to the longitudinal axis of the coil, leads to ambiguities, at least two, three, and/or all coils are inclined towards each other and/or differently orientated with respect to each other.

For more than two sensor coils the longitudinal axes of more than two of these sensor coils do not intersect at the same point; preferably the minimum distance between two intersections of different sensor coil tuples is at least 10, 20, 50 or 100 cm. This applies in particular to a view in one plane, wherein the longitudinal axes are projected onto the same plane, or wherein the longitudinal axes extend in essentially the same plane (possibly with a maximum angular deviation of no more than 30°, 15°, 10° or 5°). Moreover, a number of coil groups (e.g., 2, 3, 4 or more) may be provided at different positions.

The coil groups each comprise various orientated sensor coils, for example, 3 differently orientated sensor coils, which are orientated essentially vertically relative to each other. For a number of groups, the total signal strength value of all orientation receiving signals of all coils may be formed for the respective group, such as by addition or amount formation for the respective signal strength values. By amount formation is understood e.g. the determination of the square root of the squares of the individual arguments, wherein the arguments represent the power or the amplitude. On the basis of the total signal strength value a predefined image is used to map the total signal strength value onto a distance (or onto a distance line). The basis may be an isotropic direction characteristic for each group.

In this case mapping the total signal strength onto the distance is a one-dimensional function. Further the total signal strengths of different groups may be used in order to resolve ambiguities when forming intersections of all distance lines of the groups. Further an anisotropic direction characteristic of the groups may be respectively used as a basis, wherein the individual signal strengths of the coils of each group are mapped onto a distance line (per group) by means of an image, which reflects this anisotropic direction characteristic. The intersection or a number of possible intersections of the distance lines of the groups are formed. Further, total signal strengths for the respective groups may be formed, which are compared in order to obtain further position information and, in particular, in order to determine the relevant intersection from a number of intersections.

The spatial progression of the orientation field, or the progression of the field lines, may be detected by means of the receive signals of the coils of a group at the location of the group. In particular if the coils are aligned orthogonally to each other, the coordinates of the vector, which represents the orientation field, are obtained from the respective receiving signals of the sensor coils. In some embodiments, the orientation field is radially symmetrical, but the measuring principles described may also be applied to asymmetric fields. In particular, the method is used in an area of the orientation field, in which the field comprises essentially radially progressing field lines, which meet at a point.

This point is the center of the orientation field and usually the center of the coil, which generates the orientation field. The section, in which the orientation field is essentially a radial field, (and may be radially symmetrical), lies in the near-field range of the orientation field. In this section the direction of the orientation field detected by a group of coils corresponds to the direction, in which the coil, which generates the orientation field, lies or in that direction, in which the center of the coil or the center of the orientation field lies. In some embodiments, this direction is detected by three or four or even more groups of coils, wherein the groups are present at different locations.

In this way, by determining an area towards which all directions based on the respective groups of coils extend, the position of the center of the orientation field or the position of the coil which generates the orientation field can be ascertained relative to the groups of coils. Expressed in simplified terms, all lines reflecting the respective directions of the groups and which extend through the respective groups, meet at the same point, wherein this intersection represents the center of the orientation field or the center of the coil, which generates the orientation field. Provision may be made for correction functions, which take into account deviations of the orientation field from a radial field in order to correct individual directions ascertained by individual groups. Further an orientation field progression may be stored in which the direction and/or the strength of the orientation field is stored for a multiplicity of different points. Thus using the comparison of the directions and/or strengths detected by the groups, the most probable relative position can be ascertained.

It is possible to (selectively) use non-symmetric orientation fields, thereby saving on a sensor coil and/or a group of sensor coils, in that at least one of the (remaining) coils or coil groups detects the gradient of the orientation field. The orientation information which reflects the (spatial) gradient is also used in ascertaining the relative position. Triangulation could then for example be carried out, not by means of at least three sensors or sensor groups, but by means of one or two sensors or sensor groups, wherein the gradient and in particular the change thereof in the (spatial) gradient of the orientation field is taken into account. In particular the change in the gradient as a spherical derivation of the $2^{nd}$ order from the field to the spatial directions (x/y/z) or to the spatial angle (e.g., to rho/theta) is examined. In particular the gradient of the orientation field is taken into account when ascertaining the relative position, and/or preferably one or more derivations of the n-th order with n=1, 2, 3 or more.

A stored (non-variable) orientation field progression can be used as standard measure, which is used merely for comparison, or the stored orientation field progression may be stored so as to be variable in order to permit corrections which can be considered as a calibration. This allows a calibration to be carried out against individual orientation fields and/or sensor coils.

In some embodiments, the orientation field is detected with a number of sensor coils per group and with a number of groups resident at different locations. The coils of each group may be identically designed and only differ in their orientation. The coils may be wound around a core, wherein the core comprises in particular a ferromagnetic material in order to increase the sensitivity of the coils. If the coils of a group differ with regard to the number of windings, cross-sectional area, cross-sectional shape or permeability effective for this coil, individual receive signals of the coils may be corrected in this regard, so that each coil generates the same receive signal for the same field strength.

In the case where coils are wound around a common core, a form-dependent (or material-dependent) anisotropy of the sensitivity of the coils can be corrected by taking into account the different permeability numbers for the different directions. This allows to compensate also for anisotropies which result from the shape of the core. The core may be shaped as a cube or a sphere. Moreover, the core may be shaped cylindrically or as a cuboid, wherein the resulting different sensitivities of the differently orientated coils (i.e. the anisotropies resulting from the shape) can be compensated for. An image may be provided which reflects this anisotropy and which maps signal strengths of the orientation receiving signals onto distances or distance lines.

Moreover provision may be made for the receive signals to be attenuated, for example when the signal level of one or more receive signals exceeds a certain value due to the respective coil approaching the center of the orientation field. One or more attenuators may be provided with which the receive signals (or total receive signals) are attenuated. The attenuators are preferably adjustable. In other words, the attenuation is adjustable, preferably (steplessly) switchable, wherein in particular the same attenuation factor is provided for all coils of a group.

In some embodiments, the attenuation may be two-stage, a first attenuation possibly being an analog attenuation relating to the analog signal supplied by the coil, whilst a downstream attenuation may be a digital attenuation which relates to a digital signal which results from the analog/digital conversion of the attenuated analog signal. Two attenuators may thus be provided.

Alternatively attenuation for the input coils may vary, wherein these differences are taken into account during detection of the direction using the receive signals of the coils. One or two (or more) attenuators may be provided for each orientation field receiving signal/for each total receive signal.

Alternatively one, two or more than two attenuators are used, which attenuate a number of signals, preferably with the same (adjustable) attenuation factor or with attenuation factors which are constant in relation to each other.

Provision is made for the coils to be used for detecting the directions of the orientation field at different locations. Using these directions it is ascertained (either by triangulation, by evaluating individual signal strengths for detecting the distance or by a comparison with values reflecting the orientation field), at which location is the center or another reference point of the orientation field. Therefore it is initially detected, where this reference point of the orientation field is in relation to the coils. Using the local relationship between reference point of the orientation field and coils and/or coil groups the relative position between receiving charging coil and transmission charging coil can then be ascertained, taking into account the known spatial relationship between the sensor coils and the coil which is provided for inductive excitation. Since it is known at which place the coils are arranged, the place at which the coils are arranged on the vehicle or on the floor, using the spatial relationship between sensor coil and orientation field, the relative position between receiving charging coil and transmission charging coil can be ascertained without problems.

The relative position detected in this way may be emitted as a signal, for example a signal which reflects the relative position as coordinate values, preferably in a digital form. This relative position may for example be displayed so that the driver is given the possibility to position the vehicle correctly. The relative position may be indicated to the driver, wherein alternatively and/or in combination therewith, direction information and/or path information may be issued, which indicates, in which direction the vehicle should be positioned in order to position the transmission charging coil relative to the receiving charging coil.

Moreover provision may be made for the vehicle to be correctly positioned automatically, wherein the relative position is used as an input variable of a control loop, within which a movement (direction and/or route) of the vehicle, of the transmission charging coil or of the receiving charging coil is controlled. In particular the receiving charging coil can be aligned with the transmission charging coil by moving the vehicle and/or by activating a positioning mechanism of the receiving charging coil and/or the transmission charging coil.

Further a method is described for wirelessly charging the vehicle, which comprises the method for detecting the relative position, as disclosed here. The vehicle, the receiving charging coil and/or the transmission charging coil are aligned according to a predefined optimal relative position. The optimal relative position corresponds to the position, in which the receiving charging coil has an optimal coupling with the transmission charging coil. In particular the optimal relative position between receiving charging coil and transmission charging coil is that position, in which the receiving charging coil and the transmission charging coil are completely aligned with each other, for example a position, in which these two coils are arranged along the same axis or in which the distance between receiving charging coil and transmission charging coil is minimal or in which the received power is at its maximum.

The relative position is repeatedly ascertained during alignment, in particular by means of the process described here. By this means the vehicle, the transmission charging coil and/or the receiving charging coil can be aligned in accordance with the optimal relative position. As already mentioned the two charging coils can be guided towards each other into the optimal relative position by means of a controllable positioning mechanism. Alignment can be performed in two steps, which may overlap or which are performed in succession, wherein one of the steps comprises aligning the vehicle, and another step comprises aligning at least one of the charging coils by means of the positioning mechanism. The method for wirelessly charging the vehicle further provides for electric power to be transmitted via an alternating magnetic charge field from the transmission charging coil to the receiving charging coil.

This is carried out after the optimal relative position has been reached, wherein preferably the charge field is not generated until the optimal relative position has been reached. The charge field here has distinctly more power and/or field strength than the orientation field, wherein the charge field may for example be more powerful than the orientation field by a factor of at least 10, 100, 1000 or 10000.

In some embodiments, provision may be made for the orientation field and the charge field to be generated using the transmission charging coil. The transmission charging coil here may generate the orientation field at a first power level, until the at least one coil provided for inductive excitation (in particular the sensor coil) starts to detect the orientation field. In particular the coil provided for inductive excitation starts to detect the orientation field, when the receive signal of the coil provided for inductive excitation has a signal/noise ratio, which lies above a predefined level, or where this receive signal lies above a predefined level.

The power level of the orientation field may further be adjusted in dependence on a detected distance between the coil generating the orientation field and the coil receiving the orientation field. The distance results directly from the relative position. The power level may be reduced as the distance decreases.

For a distance below a predefined minimum distance the power may be kept constant in order to ensure a high resolution in the vicinity of the coil. In particular provision may be made for the power level of the orientation field to be controlled with a control objective, according to which the strength of the orientation receiving signal, a combination of a number of orientation receiving signals or a total orientation receiving signal lies within a predefined interval or at a predefined required power value.

The transmission charging coil and/or the coil generating the orientation field is operated with less power than the first power level while alignment takes place and after the coil provided for inductive excitation has started to detect the orientation field.

It should be noted that the orientation field may also be generated by another coil at the first power level.

Further provision may be made for the charge field to be generated by the transmission charging coil at a second power level which lies above the first level, when the optimal relative position is achieved through alignment. In particular the charge field is generated at the second power level, when the transmission charging coil is aligned completely with the receiving charging coil. In other words, the charge field is only generated when alignment has finished. The power with which the orientation field is generated while alignment is taking place is less than the first power level with which the orientation field is generated before the coil provided for inductive excitation has detected the orientation field. The first power level may be greater by a factor of at least 2, 5, 10 or 100 than the lesser power with which the orientation field is generated during alignment or after starting to detect the orientation field. By means of the different power levels of the orientation field and by means of the different power values of the orientation field in relation to the charge field interferences generated by the method are minimized.

The orientation field may be generated with a greater spatial scatter than the charge field. In particular the orientation field may be generated by the same coil as the charge field. The greater spatial scatter may be due to the core or another magnetic body being arranged at different locations. Here the core or the magnetic body, during generation of the orientation field, has a position relative to the coil generating the orientation field, which is different from when the charge field is generated. Because of the greater spatial scatter the method may be performed also if there is a large distance between the coil generating the orientation field and the coil provided for inductive excitation (by the orientation field).

Here the coil provided for inductive excitation can generally be called the coil, which receives the orientation field. One or more coils can receive the orientation field.

A further aspect of the described method consists in the detection of foreign bodies. Foreign bodies may be detected by detecting the orientation field because the orientation field is disturbed by foreign bodies, e.g. magnetic foreign bodies. This interference can be detected by way of the orientation receiving signal, as it has been described here. In particular foreign bodies can be detected by means of the steps executed in terms of the method for detecting the relative position, as well as in terms of the method for wireless charging.

Provision is made that during detecting of the orientation field, during aligning and/or during charging the coil provided for inductive excitation, in particular the sensor coil, emits a signal, in particular the receive signal, which is examined for discontinuities. Such discontinuities are, for example, local minima or maxima or generally deviations from an expected time-related or spatial distribution of the orientation field or a signal reflecting the orientation field or the charge field.

For example the receive signals of the sensor coils or groups of sensor coils may be used to detect a local change in direction of the orientation field, which indicates the presence of a foreign body. This relates to a time-limited (and thus local) change in direction as detected by a sensor group, in a signal strength as detected by at least one sensor coil, or in a detected relative position. If for example during alignment of the vehicle/the receiving charging coil or transmission charging coil, the relative position deviates briefly, a foreign body can be determined. Furthermore, during alignment a new relative position can be determined which solely results from the alignment process, wherein a deviation of this new relative position relative to a new detected relative position may lead to a foreign body being detected.

If the detected relative position does not change in accordance with the alignment of the vehicle, it may be assumed that this is caused by a foreign body which disturbs the orientation field. By way of the alignment direction and alignment path a progression of the relative position over time and/or over the path can be generated, since direction and path of the alignment and also the movement of alignment are known. When there is a deviation of the detected relative position in relation to this progression, which exceeds a predefined minimum deviation threshold value, it may be determined that a foreign body is present.

In addition the detected orientation field may be compared with an expected orientation field which for example has been stored, wherein for a deviation above a minimum deviation threshold a foreign body is ascertained. The progression of the orientation field is detected with the aid of one or more transmission coils which may in particular be spatially distributed and thereby are in a position to detect directions and strength of the orientation field at certain points. If the direction and/or the strength deviates by more than a minimum deviation threshold defines, a foreign body is detected.

In particular the direction of the orientation field can be detected at several points by means of distributed coils, wherein with a radially symmetrical orientation field the field directions, without a foreign body, point essentially to the same point, e.g. the center of the orientation field. If for example at least three spatially distributed sensor coils or groups thereof are used, each coil or group can specify a direction, in which the center of the orientation field is suspected. If these are greatly different, e.g. if there is a deviation, which lies above a minimum deviation threshold, this again may lead to the conclusion that a foreign body is present.

Moreover the detected distortions of the orientation field may be used to determine not only the existence of a foreign body but also its position, at least approximately. Furthermore the distortions/discontinuities can be used to determine the size or type of the object.

Instead of, or in combination with, a foreign body detection, the sensor coils can also be calibrated against each other if, although a signal is emitted indicating the presence of a foreign body, according to a user input or input from an additional foreign body sensor no foreign body exists. This allows the sensor coils to be calibrated against each other so that they comprise the same sensitivity. Furthermore it allows distortions in the orientation field not caused by foreign bodies to be compensated for. In case data has been stored which characterizes a required orientation field (or a required receive signal) in order to detect foreign bodies by means of a comparison with measured receive signals, this data can be adapted to the detected distortions not caused by foreign bodies.

As already mentioned this requires that an external input was made (by means of a user or by means of an additional foreign body sensor such as a camera, an ultrasound sensor, and/or a radar sensor), as to whether a foreign body exists or not, in order to draw the conclusion in case of absence of a foreign body that the distortion is not due to a foreign body but due to uncalibrated sensor coils or distortion causes, which are not related to foreign bodies. Similarly an error in the determination of the relative position can be ascertained if the actual relative position is detected due to a user input or another external input (of an additional position sensor, which for example may be from a camera, an ultrasound sensor, a radar sensor or an optical position sensor). The error results from comparing the user input or external input with the relative position detected by means of the method. The error is preferably taken account of when detecting the relative position in order to at least partially compensate for the error in position detecting.

Discontinuity is therefore understood to be a time-related or spatial discontinuity, which results from distortions of the orientation field, which occur as a result of foreign bodies. These discontinuities are mirrored in the said deviations/distortions so that the term "discontinuity" can be understood to mean the same.

The method for detecting a relative position as well as the method for wirelessly charging a vehicle can be used for performing the method for detecting foreign bodies described here. If a foreign body is found, a corresponding foreign body signal can be emitted, in particular in the form of an electronic signal, which for example can be displayed or communicated in other ways to the user. Alternatively, or in combination therewith, the signal can be used in order to, for example, control the alignment or charging process. As such, if a foreign body has, for example, been detected, aligning (of transmission charging coil and/or receiving charging coil) can be interrupted or the charge field can be terminated.

A further aspect consists in that at least one coil provided for detecting the orientation field can also be used for detecting the charge field, in particular outside the transmission and receiving charging coil, in order to detect foreign bodies during charging by way of a discontinuity as described above for the orientation field. As such a number of sensor coils may be used for example in order to receive the orientation field, as described here.

These orientation coils are used, in particular, in order to detect, during the charging operation, the charge field or its scatter around the transmission and receiving coil, in order to derive therefrom as to whether or not a foreign body is present in the vicinity of the transmission or receiving coil. In other words, the sensor coils, after disconnecting the orientation field and after connecting the charge field (or when connecting the charge field) are used for detecting foreign bodies in the charge field by way of interferences. The sensor coils thus detect not only the orientation field but also the charge field. In this respect provision may be made for the sensor coils to be attenuated during detection of the charge field, in particular for them to be attenuated more strongly than during detection of the orientation field.

A further aspect consists in that the orientation field may be modulated with an identification signal. This identification signal in particular serves to identify the transmission charging coil (and to distinguish it from other transmission charging coils). Alternatively, or in combination therewith, due to the modulation of the orientation field, the detected relative position, one or more receive signals reflecting the orientation field or a foreign body detection signal can be transmitted. In case a number of transmission charging coils are provided in the same space and/or in adjacent parking spaces, these may be modulated with different identification signals. In this way it is possible to distinguish between a number of orientation fields which may partially overlap and to perform the method for detecting the relative position only by way of a certain selected orientation field with a certain identification signal.

Further the identification signal can also transmit power data or charge types by way of modulation as well as an identifier identifying a data transmission protocol, which can be used for further communication between vehicle and transmission charging coil, e.g. an identifier which identifies a near-field communications protocol, a mobile-network-protected communications protocol or a wireless transmission protocol such as WLAN, DECT or Bluetooth (as described above). In this way it can be determined, for example initially by way of the identification signal in the orientation field, in which way the vehicle can or shall communicate with the transmission charging coil.

In addition the identification signal can identify provider data, e.g a provider identification, a tariff, or similar. In this way the orientation field gains an additional use, so that as early as at the start of detecting the relative position, the provider or the maximum power of the transmission coil can be detected by the vehicle. To this end the transmission charging coil can comprise a communications unit and/or a control unit, which processes such data and which establishes communication with the vehicle.

The orientation field can reflect, in particular, information on current operating states of the transmission coil (temperature, power, frequency or similar) or also data used in accounting such as the tariff or the provider.

The identification signal can be modulated on the orientation field through amplitude modulation, frequency modulation or through code-multiplex modulation, through orthogonal frequency multiplexing as well as through phase modulation. Frequency modulation may be used, in which the main frequency of the transmission charging coil and/or the coil generating the orientation field is used as the center frequency. Alternatively the orientation field can be modulated on a frequency channel, other than the main frequency (mean frequency) of the orientation field, of the charge field.

As mentioned in the beginning, by using a coil for detecting the orientation field it is possible to in principle block out control signals through stationary magnetic fields. Therefore an orientation signal receiver is also proposed, which comprises a coil provided for inductive excitation. This coil is designed in the form of a vehicle-side or stationary sensor coil. The at least one sensor coil used in the orientation signal receiver may be designed like the at least one sensor coil described here. In particular, a number of sensor coils may be provided, which have a different orientation and/or which are provided at different locations.

In particular differently orientated sensor coils may be combined to form a group, respectively. The sensor coils of a group are preferably provided at the same location, whilst the sensor coil groups are at different locations. As already mentioned the at least one sensor coil may be provided on the vehicle side, in particular on the vehicle floor, or may be provided in the floor of a parking space, preferably in the vicinity of the transmission coil. Especially preferably the sensor coils are arranged around the transmission coil or the transmission coil is provided in an area between the sensor coils, preferably in the middle thereof of the sensor coil groups where the sensor coils are stationary (i.e. on or in the floor).

The orientation signal receiver further comprises a receiving device with an input, which is connected to the sensor coil. The receiving device may further comprise an attenuator arranged downstream of the input which is preferably adjustable. The receiving device may further comprise an amplifier with a adjustable amplification factor, which is arranged downstream of the input and in particular downstream of the attenuation drive.

Further attenuators may be provided in the receiving device, which also are switchable. In particular an attenuator may be provided which is arranged directly downstream of the input and which is designed to be analog, whilst the receiving device further comprises another attenuator which is arranged downstream of the first-mentioned attenuator, and which is adapted to attenuate signals according to digitally adjustable attenuation factors. The input is designed for connecting at least one sensor coil so that with a number of sensor coils the input is designed for connecting a number of sensor coils. In other words, the input can be a multi-channel input. Each channel or each transmission coil may have 1, 2 or more attenuators provided for it, wherein their attenuation factor is either the same, or the attenuation factor is adapted to the sensitivity of the coils, so that for coils with different sensitivities the respective attenuation factor compensates, at least partially, for the difference in sensitivity.

In some embodiments, the orientation signal receiver is frequency-selective. Here, the receiving device may be frequency-selective. The receiving device further is preferably configured to receive, via the input, an orientation and receive signal from the at least one coil provided for inductive excitation. This frequency-selectiveness makes it possible to also block out magnetic alternating fields which, as interference signal, overlay the respective orientation field. Therefore, whilst by merely using one coil, static magnetic fields as they can occur for example in reinforced concrete buildings or steel-based parking spaces can be blocked out, the frequency-selective receiving device makes it possible to also block out non-static magnetic fields, i.e. alternating fields, which otherwise would interfere with the detection of the orientation field. In this way it is possible to use at least one sensor coil for position detection/correct alignment, without existing interference signals (in particular outside the frequency of the orientation field or even stationary magnetic fields) being able to interfere with this process.

The orientation signal receiver comprises at least one resonance circuit which comprises the sensor coil as well as a capacity connected thereto. The capacity connected to it is, in particular, part of the frequency-selective receiving device, so that a sensor coil connected to the capacity via the input of the receiving device, together with the capacity forms a resonance circuit. Due to the fact that the capacity is part of the receiving device the receiving device is frequency-selective. The capacity and the sensor coil may be connected in parallel or in series, wherein the resonance circuit is a serial or parallel resonance circuit, in the simplest case an LC resonance circuit.

The resonance circuit comprises a center frequency which preferably corresponds to the main frequency of the orientation field. In particular at least 10%, 20%, 50%, 80% or 90% of the power of the orientation field and/or the orientation receiving signal is within a frequency range which lies the resonance frequency of the resonance circuit. The frequency range in which the resonance frequency of the resonance circuit lies, corresponds to the resonance frequency with a deviation of no more than +/−50%, 2% or 1% of the frequency. In other words, the resonance frequency of the resonance circuit essentially corresponds to the frequency of the orientation field. This applies, in particular, to all sensor coils, wherein in particular coils of the same group and/or the same orientation should comprise the same inductivity. In order to compensate for deviations in inductivity, the respective connected capacities may vary, so that essentially the same resonance frequency results. In particular at least one of the capacities may be adjustable.

The resonance circuit comprises a quality of in particular more than 100, more than 200 or more than 500.

In some embodiments, the resonance circuit is attenuated and comprises an attenuator, in particular in the form of a resistance. This resistance may provide the attenuator described here, since this resistance attenuates the receive signal in that it reduces the quality of the resonance circuit. The attenuation of the resonance circuit or the resistance may be adjustable. (With parallel resonance circuits) the resistance may in particular be particularly high or may be switched off, when the sensor coil starts detecting the orientation field or before the orientation field is at all detected. With series resonance circuits this applies to the conductive value of the resistance. With further approximation to the center of the orientation field, generally for an increase in the receive signal, the resistance may be added in or may be reduced in order to attenuate the vibrating circuit in which the sensor coil is provided. (With series resonance circuits this applies to the conductive value of the resistance.)

In this way the dynamic range of the receiving device may be enlarged. In some embodiments, all sensor coils, in particular sensor coils of the same group or sensor coils of the same orientation are attenuated in equal measure so that for a number of sensor coils and/or for a multi-channel input of the receiving device a number of resistances are provided. In particular the attenuation of coils of the same orientation is the same, wherein the attenuation of coils of different orientation may vary, e.g. in order to have a desired (minimum) signal level for coils of the same orientation.

A resistance may be provided in each resonance circuit which selectively attenuates the vibrating circuit. The resistance provided for attenuation may be switchable and/or adjustable, wherein in particular digitally adjustable resistances or resistance networks may also be used. During detection of the strength of the orientation field or during evaluation of the receive signal the degree of attenuation is taken into account in order to be able to detect the actual strength of the orientation field as well.

Alternatively, or in combination with a resonance circuit, a filter may be provided, in particular in the frequency-selective receiving device. The filter comprises a passing range, in which the orientation field lies, which is adapted to induce the orientation receiving signal in the sensor coil. Preferably at least 50, 80, 90 or 95% of the power of the orientation field falls within the passing range. The passing range may be narrow-band if the orientation field comprises essentially only one frequency, wherein in this case the passing range may cover at least 95 or 99% of the spectrum of the orientation field.

Alternatively a low-pass filter or a high-pass filter may be provided, with which interference components may be separated from the useful signal provided by the orientation field. In particular the passing range of the filter can be orientated towards the interference components to be expected, in order to provide a passing range, which blocks out at least 50, 90 or 95% of the expected interference components.

The filter may be a filter of the first, second or higher order, may be designed as an analog or digital filter, may in particular be an RC-member or may be designed as a piezoelectric crystal or surface acoustic wave filter. It should be noted that the orientation signal receiver comprises at least one of these frequency-selective measures and preferably comprises a number of these components in order to achieve that the interference components are reduced to a minimum. In particular the orientation signal receiver may comprise a resonance circuit as described here as well as a downstream filter.

In addition at least one attenuator may be provided upstream or downstream of the resonance circuit and/or upstream or downstream of the filter described here. In particular an attenuator in the form of a switchable resistance or a variable resistance may be provided on the resonance circuit, whilst a further attenuator is provided between the resonance circuit and the filter. As already mentioned, the receiving device may comprise one or more parts, preferably a channel is provided for each coil. Each channel comprises a resonance circuit and/or a filter and, as required, at least one attenuator. The channels (as regards filter, resonance circuit and attenuator) are preferably constructed in the same way, but may be developed differently in order to compensate for varying sensitivities of the coils or to create sensitivities selectively. In particular, anisotropies of the coil and/or the magnetic core, around which the coil is wound, can be compensated for by using different attenuation factors in the channels. However, the ratio of the attenuation factors of the channels/the ratio of the sensitivities of the different channels or coils may be constant.

The orientation signal receiver may be provided with a plurality of sensor coils. These are arranged so as to be inclined towards each other or are differently orientated. In particular they can be arranged perpendicular relative to each other and thereby form a Cartesian coordinate system with orthogonal axes. The sensor coils are preferably designed in a similar manner and comprise the same sensitivity. In particular the number of sensor coils preferably have the same number of windings, the same winding cross-sectional surface, the same length and/or the same cross-sectional shape. As already mentioned, different inductivities and/or different sensitivities of the sensor coils can be compensated for, at least partially, by different attenuation factors and/or different filters and resonance circuits.

The sensor coils inclined towards each other may be provided at the same location. Further a number of sensor coils may be provided which have the same orientation, e.g., are inclined in the same way, but are provided at different locations. In particular, the sensor coils may be provided in groups, wherein in each group a number of sensor coils are provided which are inclined towards each other (preferably 3 coils orthogonally inclined towards each other), wherein the groups are arranged at different locations on the vehicle or on the floor of the parking space. In particular, the sensor coils may be grouped around the transmission coil or around the receiving coil.

Sensor coils inclined towards each other, in particular of one group, may be arranged on the same holder. In particular, sensor coils inclined towards each other, in particular of one group, may be wound around the same magnetic core, which in particular is a ferrite core. The ferrite core may, in particular, have a spherical or cube-like shape, wherein with cube-like or elliptical cores the resulting form anisotropy can be compensated for as mentioned above. The centers of the sensor coils inclined towards each other may be in the same spatial area, which is, in particular, an (imagined) sphere or an (imagined) cube with a diameter and/or an edge length of no more than 10, 5 or 2 mm. The imagined sphere and/or the imagined cube, in which the centers of the sensor coils inclined towards each other lie, may have a maximum dimension of no more than 30, 10, 5 or 2 percent of the maximum dimension of the sizes of the sensor coils.

Each group of sensor coils may be provided with a receiving device as described here, to which the coils are connected. For a number of groups therefore a number of receiving devices may be provided in order to minimize interferences resulting from long transmission lines. The groups can thus be arranged at a large distance from one another without the device becoming sensitive to interferences because of long transmission lines for the receive signal. Since each receiving device processes the receive signal of the sensor coils, lesser interference components result. A central unit may be provided to which all receiving devices of all groups are connected, so that this can evaluate the signals of the different groups.

Finally an inductive charging device for a vehicle with an orientation signal receiver is proposed, such as described here. The charging device further comprises a position calculating device, which is arranged downstream of the orientation signal receiver. The positioning mechanism is adapted to ascertain a relative position (generally in terms of a direction, a vector or a distance) between the vehicle and a fixed transmission charging coil using the orientation receiving signal of the receiving device. In particular, the position calculating device is adapted to process the orientation receiving signal of the coils after they have been processed in the receiving device. Since the information content is the same, no difference is made between an orientation receiving signal directly present at the coils and an orientation receiving signal which is emitted by the receiving device, and which corresponds to a processed (filtered or attenuated) receive signal directly at the sensor coils.

The charging device further comprises an alignment signal generator arranged downstream of the position calculating device. The alignment signal generator is adapted to generate an alignment signal using the relative position of the position calculating device.

The alignment signal may be utilized in a passive or in an active manner. Therefore the alignment signal generator may be designed to generate an alignment signal which is suitable to be displayed by means of an optical, acoustic or haptic display. Alternatively or in combination therewith the alignment signal generator may be designed to generate an alignment signal which is designed to activate the positioning mechanism. The positioning mechanism is provided with an actuator of the receiving charging coil or the transmission charging coil and is adapted to move these coils relative to the vehicle (in the case of a movable receiving charging coil) or relative to the floor of the parking space (in the case of a movable transmission charging coil).

Both the position calculating device and the alignment signal generator may be in the form of a processor in combination with a respective running program, so that the program, together with the processor, realizes the functions of the position calculating device and the alignment signal generator. Parts of these components may be hard wired or may be present as an analog circuit, wherein, however, a program is preferably provided which when executed on the processor, determines the relative position between vehicle and transmission charging coil, in order to generate the alignment signal according to the relative position. The optical signal may be indicated, in particular, on a display, for example in the form of arrows or similar. This display may be part of the charging device.

Furthermore acoustic or haptic transducers may be used for the display of the alignment signal, wherein the acoustic transducer can emit a sound signal or a speech signal and the haptic transducer acts, in particular, on the steering wheel and/or the accelerator or brake pedal. The haptic transducer can, for example, generate a counter force, in case the driver steers into a direction which does not result in an optimal alignment of the transmission charging coil to the receiving charging coil.

Finally the inductive charging device can comprise a foreign body detection device. This is preferably arranged downstream of the orientation signal receiver. The foreign body detection device is adapted to ascertain discontinuities in the orientation receiving signal of the receiving device. To this end data may e.g. be stored in the foreign body detection device, which characterizes the orientation field in the interference-free case, in order to ascertain any deviations of the detected orientation field from this stored orientation field. To this end the foreign body detection device may comprise a memory, in which this data is stored. Moreover the foreign body detection device may comprise an input, via which the device receives path data and/or angle data (generally: movement data) of the vehicle in order to be able to ascertain the movement of the vehicle during alignment.

A detection unit of the foreign body detection device ascertains which signals or which relative position is to be expected based on this received data. A comparing device of the foreign body detection device ascertains, whether the predicted data regarding the relative position and/or the field strength or strengths of the orientation field match the detected relative position or the detected receive signal or whether deviations are emerging which lie above a minimum deviation threshold. If this is the case the foreign body detection device can determine that a foreign body is present. By way of the comparing device the foreign body detection device is designed, using the orientation receiving signal/using the detected relative position, to ascertain a deviation from a stored undisturbed orientation field/from the predicted relative positions or receive signals.

An error generator in particular connected to this comparing device is designed to emit an error condition signal, if such discontinuities are present. The error generator may be designed to merely indicate that a foreign body has been detected, or may be designed to emit a signal which characterizes the foreign body, for example its size. The error generator comprises an image which assigns to the result signal of the comparing device an identifier of the foreign body (size, type). The error generator may also be designed to indicate, in the form of a signal, not only the presence of a foreign body but also its position. To this end the error generator may be connected to the position calculating device and/or comprise an image which assigns to the detected discontinuity a location at which this occurs.

It should be mentioned that using the method the approach is already shown during foreign body detection, so that the foreign body detection device described here can be designed according to the above-described properties and functions. The error generator may have a display or an acoustic transducer arranged downstream of it, which indicates the error signal to the user, or a control device may be arranged downstream of the transmission charging coil, which on receipt of an error condition signal reduces the charging power or terminates the charging operation/cuts off the power supply to the transmission charging coil.

FIG. 1 shows an orientation field 100, which is generated by a coil 110. The coil 110 is, in particular, a stationary transmission charging coil, but may also be a vehicle-side receiving charging coil, which is acted upon by a respective current signal, which generates the orientation field. Solid lines indicate a vehicle 120 as well as vehicle-side sensor coils 122a to 126c arranged thereon. In case the coil 110 is provided as a vehicle-side receiving charging coil, the sensor coils 122a to 126c are stationary.

The orientation field 100, which spreads out from the coil 110, is a radially extending field and is in particular radially symmetrical, wherein in FIG. 1 (and also in FIGS. 2 and 3) the orientation field 100 is shown only by way of the field components which lie in the drawing plane.

The coil 110 lies in the center of a coordinate system marked with x, y and z. The field lines spread radially from this origin at least in the x/y plane and extend radially away from this origin. The origin corresponds to the center of the coil 110.

The coils 122a to 126c are arranged in groups 128a-c. Each group 128a-c comprises a coil 122a, b, c, aligned in y-direction, a coil 124a, b, c aligned in z-direction and a coil 126a, b, c aligned in x-direction.

The coils of each group are orientated in different ways to each other, so that the field direction can be spatially determined. In each group 126a, b, c the field strengths of the coils of this group are set into relation with each other, so that a direction Ra, Rb, Rc is determined by each group.

FIG. 1 shows the simplified case of a two-dimensional position detection, from which follows that each group 128a-c requires only two differently orientated coils, the orientation directions of which do not extend at a 90° angle to the plane, in which the direction is calculated. Thus the coils 122a-c and 126a-c may for example be used to determine the direction Ra-Rc (in the xy-plane). In this case the directions reflect a two-dimensional direction. Due to the radial spread of the orientation field all directions Ra-Rc point to the center of the coil 110, so that the intersection is formed by two (or by three) directions. The intersection is formed by starting, respectively, from the position of one coil group on the vehicle 120, and based on this starting position, proceeding further in the direction Ra-Rc. If, as shown in FIG. 1, the number of sensor groups is greater than the dimension of the positioning (i.e. the dimension of the direction/the relative position), then the intersections can be compared with each other. Further the position of the origin of the orientation field can be determined as a point between the intersections.

If widely varying intersections result, which in particular deviate from each other by more than a predefined minimum distance, this may be interpreted as a field distortion which is triggered by a foreign body. In this case an error signal may be issued which reflects the presence of a foreign body in the orientation field. This forms in particular the basis for a diagnosis, i.e. a detection whether or not a foreign body is present. A further advantage in using 4 instead of 3 sensors consists in that one can activate the 3 "best" sensors (i.e. those with the best signal/noise ratio) (or use their signal), depending on whether the vehicle approaches the orientation coil by moving forwards or by moving backwards.

Each coil group 128a-c respectively issues not only a direction Ra-Rc. Rather there are Ra1 and Ra2, which in this case are mirrored on the x-axis because only the angle between x and y can be measured, but not their signs. The measured results are not vectors, but straights, wherein for better understanding they are represented by arrows in the figures. Thus each sensor 2 comprises different straights. If one takes only 2 sensors, this results in 2 intersections, which may perhaps be distinguished from each other by the field strength/the z-axis. The result, in this case, may however be ambiguous, but may be resolved in particular by the approaches described here. If however, one takes three sensors, then 3 straights intersect in only one point. This point can be unequivocally assigned to the transmission coil.

Furthermore directions can be ascertained by way of the sensor groups, which can be represented as Ra'-Rc' (dashed arrows with the same length as Ra-Rc) because the directions are ascertained with an ambiguity of 90°/180°. Using redundant sensor groups or sensors or using gradient examination as described above, this ambiguity can be resolved.

The variation of the orientation field receive signal of the coils 124a-c (which are aligned in parallel to the coil 110), in dependence on the distance from the origin of the orientation field, may be used for further orientation due to it being dependent on the distance from the center of the coil 110. In particular the orientation receiving signals of these coils can, like the other coils, be used for detecting the relative position, or they can be used for resolving ambiguities during ascertaining relative positions, for which the other coils (i.e. coils not parallel to coil 110) are used. Since the progression of this orientation receiving signal of the coils 124a, b, c, due to the known progression of the orientation field, is also known, this can be compared with ascertained progressions of the coils 124a-c, in order to draw conclusions as to the relative position or at least as to a distance to the center of the coil 110.

Figure 2:
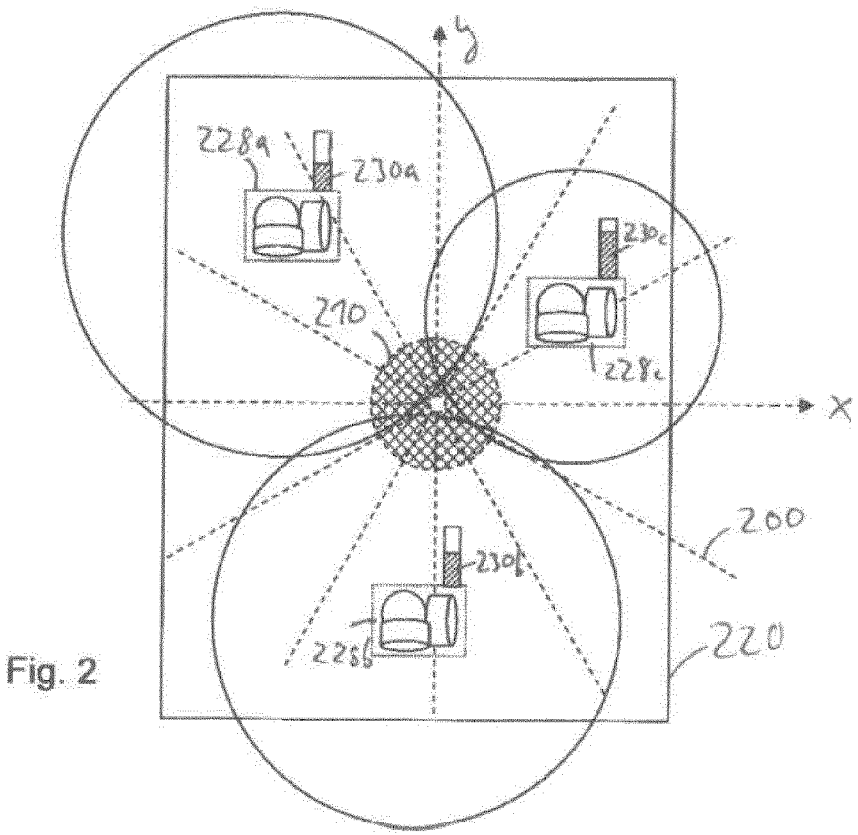

FIG. 2 shows an orientation field 200 which corresponds to the orientation field 100. This is generated by a coil 210, which again corresponds to the coil 110. Also the coil groups 228a-c correspond in their construction to the coil groups 128a-c, wherein however, for better representation their positions are different from the positions of the sensor coil groups 128a-c.

Each coil group 228a-c has at least two or three, sensor coils, which are differently orientated. According to the approach which forms the basis for FIG. 2, a total signal strength of each group 228a-c is used to calculate the distance from the center of the coil to the respective group 228a-c. Based on the distances, lines (for a two-dimensional relative position) or areas (for a three-dimensional relative position) can be drawn, along which the center of the coil 210 can be expected. In the center of each of these lines or areas is a coil group.

For each coil group 228a-c, a dependency of the total signal strength on the distance to the center of the coil 210 is predefined. This dependency can be ascertained empirically or can, based on the assumption of a quadratic drop in signal strength with increasing distance, be provided as a simplified approximation. Other dependencies may be provided, such as in the form of functions, which approximately reflect the correlation between signal strength and distance, wherein these functions are of a higher order than the simplified approximation or are determined by more parameters than the simplified approximation.

The total signal strength is represented by way of a bar 230a-c. The longer the bar, the higher the signal strength, wherein it can be seen from FIG. 2 that the signal strength 230a-c drops with increasing distance from the center of the coil 210. The coil group 228c lies nearest the center of the coil 110, wherefore its total signal strength 230c is higher than the total signal strength 230b, which is again higher than the total signal strength 230a, which stems from the furthest away group 228a.

FIG. 2 shows that due to commonly known deviations, the lines along which the center of the coil 210 is expected, do not pass exactly through the center of the coil 210.

A number of intersections result between individual circles (generally: closed lines consisting of points associated with the same signal strength), wherein the center is formed in an area between the intersections nearest to each other. Taking the two intersections of two circles, that intersection is used, which has the shortest distance to two intersections of another circle pair. The center may be provided as the center of the area obtained in this way. In FIG. 2 it was assumed that the relationship between signal strength and distance is not direction-dependent, so that there are two circles in each case, in which the center of the coil group lies.

When taking account of the dependency on direction, there are closed line shapes which deviate from the circles, wherein these closed lines also, as described above, can intersect with each other, wherein the alignment of the coil group relative to the vehicle has to be taken into account. The total line is formed e.g. as the sum of all field strengths of all coils of one group. Since the field strength is unequivocally linked to the strength of the orientation receiving signal, these two terms are equivalent to each other.

In three-dimensional terms, one speaks not about closed lines, but about closed areas, which consist of points which are associated with the same (total) signal strength. These areas can be called "Iso signal strength areas". In two-dimensional terms the lines can be called "Iso signal strength lines". These areas/lines are merely used for graphic illustration and in calculation procedures may be reflected as equation systems. Instead of total signal strengths of a coil group it is possible to use the signal strengths of a single sensor coil.

Figure 3:
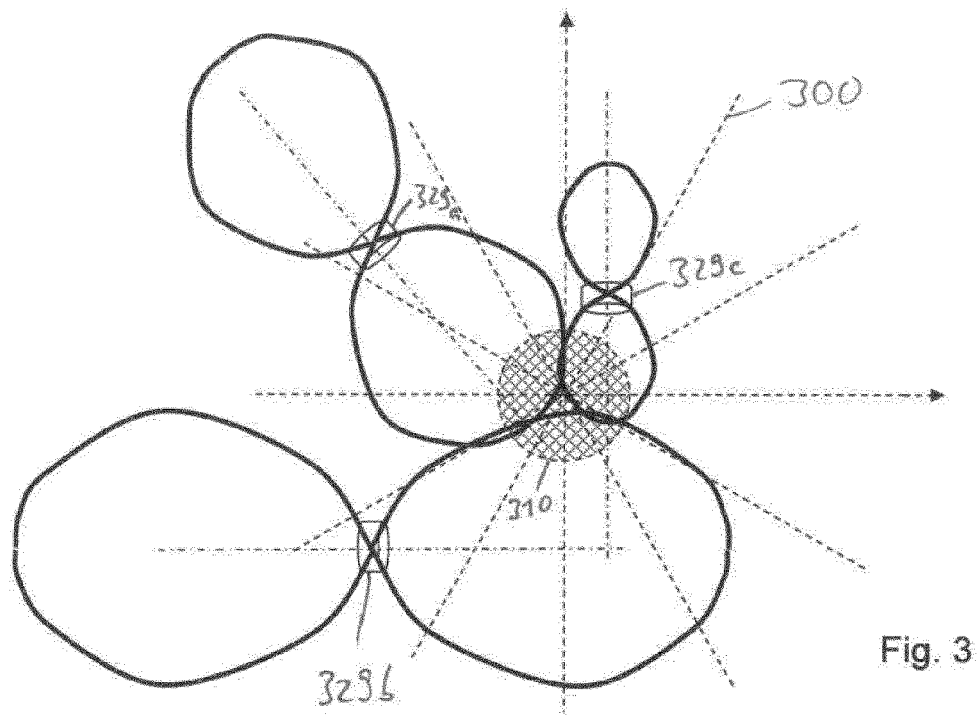

FIG. 3 shows a further variant for position determination, wherein three different coils are used which are present at three different locations. Here the coils 329a-c are arranged at different locations of a vehicle (not shown). Since coils can be excited only by magnetic field portions which extend at right angles to the respective coil surface, the resulting direction characteristics have the shape of an eight (or direction characteristics based on: sensitivity (alpha)=N*cos (alpha) or =N*cos²(alpha), wherein alpha is the angle of the field to the coil longitudinal axis and N is a constant).

The strength of the orientation receiving signal, with such a constellation, does not only depend on the direction but also on the distance, so that when an orientation receiving signal of a certain strength is received by one of the coils 329a-c, a determination can be made via a predefined image which reflects the direction characteristic, on which line the center of the coil is located. The coil 229c lies closest to the center of the coil 310, which generates the orientation field 300. Due to the high signal strength (compared to the other coils) it follows that the distance between coil 329c and the center must be particularly small. In other words, the line shaped as an eight, along which the center of the orientation field 300 is to be expected, gains in size as regards its extension/its area, as the strength of the orientation receiving signal of the respective coil decreases. This correlation may be predefined, for example in the form of a simplified approximation of a quadratic drop in signal strength with the distance or in the form of other approximations or images.

FIG. 3 also reveals intersections, which can be evaluated as shown in FIG. 2. As in FIG. 2, the lines in FIG. 3, on which the center is to be expected, are uniformly increased for all groups or coils, until two intersections always form between two different curves. Also in FIG. 3 the intersections of a remaining combination of two lines are formed, which lies closest to the intersections of another combination of lines. Between these formed intersections there is an area in which the center of the orientation field 300 lies. In some embodiments, the center of the field is ascertained and is detected as the center of the orientation field. Due to the known uniform relationship between the coils (or between the coil groups of FIGS. 1 and 2) the relative position of the vehicle/the receiving charging coil of the vehicle to the center can thus be determined.

FIGS. 1-3 describe the coils, which receive the orientation field, as sensor coils. The coils which receive the orientation field, may further comprise sensor coils or the receiving charging coil, if the transmission charging coil generates the orientation field (=first case). Furthermore the coils which receive the orientation field may further comprise sensor coils as well as the transmission charging coil, in case the receiving charging coil (by supplying a respective signal) generates the orientation field (=second case). The signal generated in the receiving charging coil (first case) or in the transmission charging coil (second case) is an orientation receiving signal which is evaluated like a signal of a sensor charging coil, if required including a signal adaption, which takes account of the different electromagnetic properties of the sensor coil on the one hand and of the transmission or receiving charging coil on the other hand, or which at least partially compensates for it.

Figure 4:
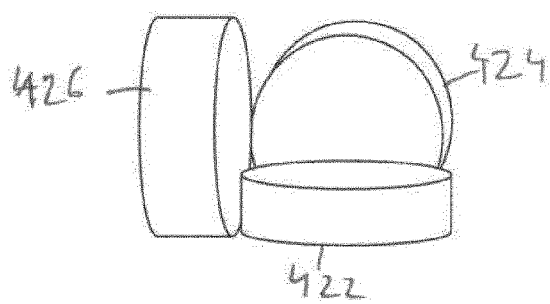
FIGS. 4 and 5 show example ways of arranging the sensor coils.

FIG. 4 shows an exemplary arrangement of a group of coils 422-426. The coils 422-426 are differently orientated, wherein FIG. 4 shows an arrangement, in which the coils 422-426 are arranged perpendicular to each other, respectively. Furthermore it can be seen that the coils are arranged essentially without any space between them, and that their longitudinal axes intersect in one point (or in a small area). The coils shown in FIG. 4 are cylindrical and in particular comprise the same number of windings and the same dimension. The coils of one group may respectively comprise an angle to each other with an amount of at least 45°, preferably with an amount of at least 60°, 70° or 85°.

Figure 5:
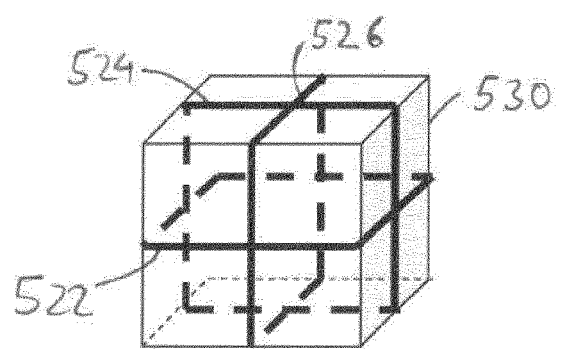

FIG. 5 shows a further group of sensor coils, which are wound around a common core 530. The core 530 is cube-shaped, wherein the coils respectively extend over the edge centers. A first coil 522 is aligned towards the top and/or the bottom, similar to the coil 422 of FIG. 4. A second coil 524 is aligned vertically to the drawing plane. A third coil 526 is aligned in left-right-direction, corresponding to the coil 426 in FIG. 4. The coils 522-526 have preferably the same number of windings. Due to the cube shape of the core 530 the coils 522-526 also have the same dimensions and/or the same cross-section or cross-sectional area. The length of the coils also is preferably the same.

A further embodiment is a coil (e.g. a cube-shaped 3D coil), which has a further similar cube-shaped 3D coil wound around it, which is inclined relative to the individual coil planes. An unequivocal direction Ra . . . Rc could be gained thereby, thus permitting savings on sensors compared to a simple 3D coil.

Figure 6:
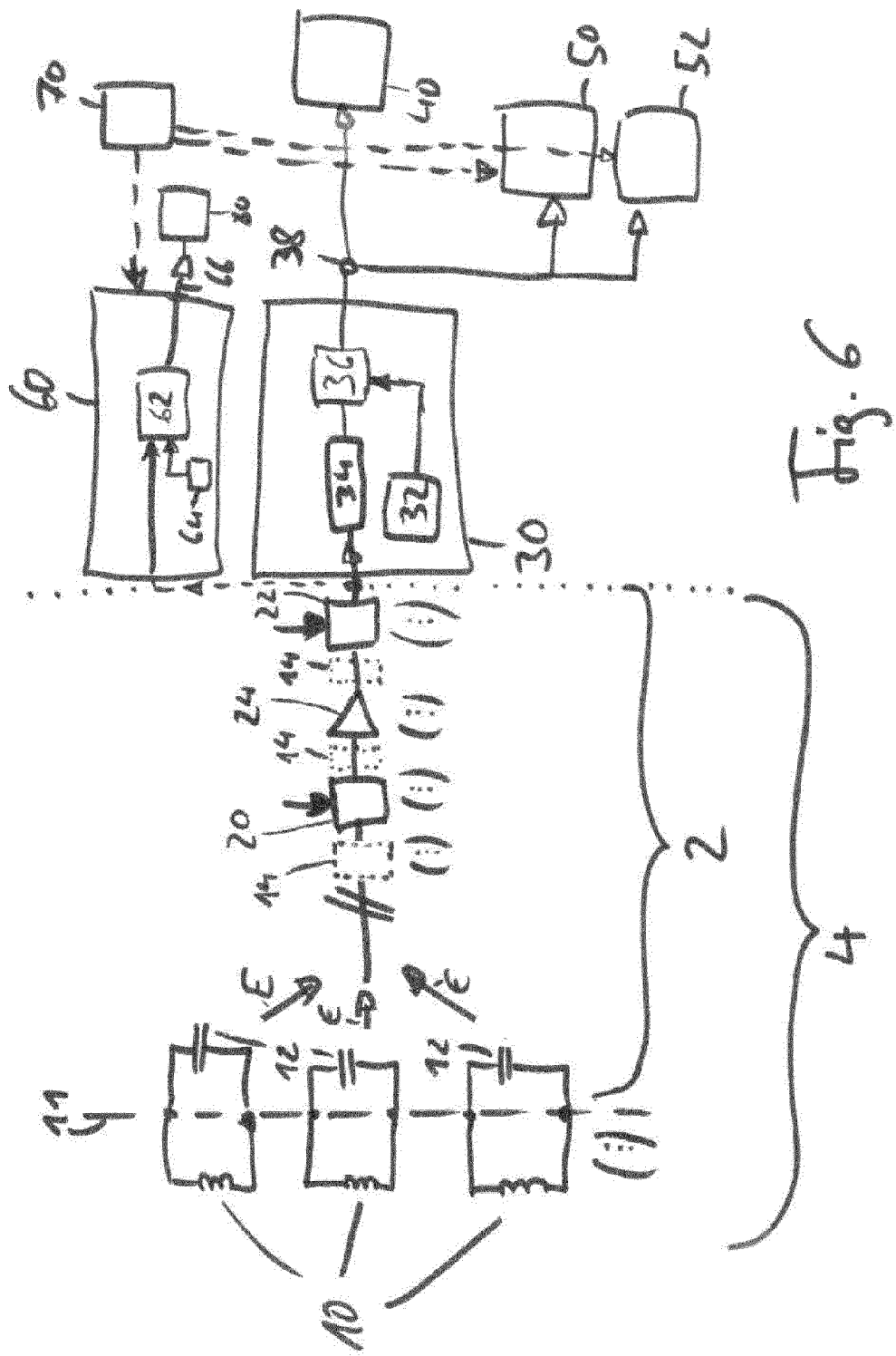
FIG. 6 shows an exemplary block diagram for explaining example embodiments of an orientation signal receiver and an inductive charging device.

FIG. 6 shows orientation coils 10, which are connected to the receiving device 2 via an input 11 of a receiving device 2. The receiving device 2, together with the coils 10, forms an orientation signal receiver 4. The receiving device 2 comprises, for each coil 10, a capacitor 12, which is connected in parallel to the input 11 and thus also in parallel to the respective coil 10. This leads to resonance circuits (also called vibrating circuits), which are respectively formed by a coil 10 and a capacity 12 (12a-c) connected thereto. The coils 10 (10a-c)/the resulting resonance circuits generate orientation receiving signals E (Ea-c) which are processed further in the receiving device 2. Preferably a channel is provided for each orientation receiving signal, in which the respective orientation receiving signal is processed, wherein for simplifying the view FIG. 6 only shows one exemplary channel representative of all channels of the orientation receiving signals E. This simplified notation is identified by a double line which crosses the depicted channel ("data bus representation").

The receiving device comprises an attenuator 20 and a further attenuator 22, which are both adjustable, and which have an amplifier 24 arranged between them. The amplifier 24 may also be adjustable. Preferably only one attenuator 20 is provided upstream of the amplifier 24, if the amplifier 24 itself is adjustable with respect to the amplification factor.

Furthermore additional filters 14 may be provided before the attenuator 20, which is before the amplifier 24, between the attenuator 20 and the amplifier 24 and/or between the amplifier 24 and the attenuator 22 arranged downstream of the amplifier 24.

All attenuators of all channels which are located in the same position relative to the respective amplifier 24, are activated together (e.g. in the same manner). With a particularly simple embodiment the attenuator 20, which is arranged upstream of the amplifier 24, is provided in the form of a resistance, which attenuates the respective vibrating circuit, which comprises the coil 10 and the capacitor 12. The resistance can be connected like a series resistance or can be connected as a parallel resistance (as shown). The resistance can be, in particular, connected or disconnected (i.e. bridged or decoupled) or can be adjusted discretely or continually in respect of value.

The attenuator 20 arranged upstream of the amplifier 24 is adjusted such that the maximum signal strength of the amplifier 24 is not exceeded. Instead of the amplifier 24 an analog/digital converter may be provided (the sensitivity of which is either constant or can be adjusted). Furthermore the attenuator 22 arranged downstream of the amplifier/the transducer 24 may be an electronic attenuator or a switchable resistance network, in which the attenuation can be adjusted as discrete attenuation.

A position calculating device is arranged downstream of the receiving device 4, in which the position of the coils 10 relative to each other, e.g. the spatial relationship between the coils 10, is stored, in particular in a memory 32. Furthermore an image is stored in the position calculating device 30, which maps signal strengths onto distances. Since generally the signal strength decreases as the distance increases, or in other words, a dependency between signal strength and distance develops in the near-field, which is influenced by the coil geometry, conclusions can be drawn as to the distance on the basis of the signal strength. A unit 36 for forming the intersection and/or selecting the correct intersection may be provided, in order to ascertain, as described above, the center of the orientation field.

With an alternative approach, the position calculating device 30 comprises a direction detecting unit 34, which forms a relationship between the orientation receiving signals from the groups of provided coils, in order to indicate a direction for each group. The spatial relationships between the groups of coils are stored in a memory 32 (as a look-up table, function, function parameters or similar), so that a combination device 36 can form the straights on the basis of the positions of individual groups by way of the directions of the unit 34, wherein the unit 36 is additionally adapted to determine an intersection between the straights. This intersection is sent to the output 38 for supplying the relative position.

The output 38 may have a display 40, in particular an optical or graphic display, arranged downstream of it in order to display the relative position of the vehicle in relation to the center of the orientation field.

Since apart from a passive subsequent use of the relative position, an active use may also be provided in terms of a display, FIG. 6 shows a positioning mechanism 50/a steering and/or longitudinal control 52 of the vehicle. The transmission coil or receiving coil is aligned with the aid of the positioning mechanism 50. Alternatively or in combination therewith the (active) steering and the longitudinal control 52 of the vehicle may be used for aligning the vehicle itself and thus the receiving charging coil above the transmission charging coil.

FIG. 6 further shows a foreign body detection device 60, which also receives data from the receiving device 4. These orientation receiving signals, which are transmitted from the receiving device to the foreign body detection device 60, are forwarded to a comparator 62. Further a field progression 64 stored in a memory is supplied to the comparator 62, so that the comparator 62 can compare the field progression 64 as a required field progression with the orientation receiving signal, which reflects the currently detected field. If there is a difference (e.g. a distortion of the orientation field) which lies above a predefined minimum threshold, a corresponding signal is issued at the error signal output 66. Since the comparator 62 issues the error signal, this may also be called an error generator.

A movement detection device 70 of the vehicle may supply data to the foreign body detection device, which reflects the longitudinal movement and/or the movement direction of the vehicle. This information may be used in the foreign body detection device 60 in order to be able to determine, using the stored field progression 64, how according to the movement of the vehicle the orientation receiving signals should develop, in order to be able to compare this development with the actual orientation receiving signals.

Furthermore provision is made for a control 80 of the charge field, which may be arranged downstream of the error signal output 66 of the foreign body detection device 60. If an error signal is output by the foreign body detection device 60 at the error signal output 66, this causes the control 80 to reduce the power of the transmission charging coil and thus the strength of the charge field (or the orientation field), or to disconnect the transmission charging coil. Instead of the transmission charging coil the coil generating the orientation field may have its power reduced or may be disconnected. Therefore, if there occurs a distortion of the orientation field or the charge field caused by the foreign body, this can be determined by means of a comparison between the actually detected orientation receiving signals and the required field progression 64, which may equally be provided as a quantity of required orientation receiving signals (or as required orientation receiving signal). Comparing this data will reveal, whether the orientation field or the charge field is distorted, so that due to a foreign body being detected in this way the charge field may be switched off via the control 80. Alternatively to the above description of the control 80, the control 80 may also be the control of the orientation field, so that generation of the orientation field is interrupted if an error signal is issued at the error signal output, which indicates a foreign body.

The invention claimed is:

1. A method for detecting a relative position between a vehicle-side receiving charging coil and a fixed transmission charging coil, the method comprising:
   generating an alternating magnetic orientation field using one of the coils;
   detecting the orientation field using at least one coil provided for inductive excitation, wherein the orientation field is detected in a frequency-selective manner by the at least one coil; and
   ascertaining the relative position using an orientation receiving signal induced by the orientation field in the at least one coil.

2. The method as claimed in claim 1, wherein the at least one coil provided for inductive excitation is part of a resonance circuit, the resonance frequency of which corresponds to a frequency of the orientation field.

3. The method as claimed in claim 1, wherein the orientation receiving signal is directed through a filter which comprises a passing frequency range, within which the frequency of the orientation field lies.

4. The method as claimed in claim 1, wherein the orientation field is generated by the transmission charging coil and the at least one coil provided for inductive excitation detects the orientation field on the vehicle side.

5. The method as claimed in claim 1, wherein the orientation field is generated by the vehicle-side receiving charging coil and the at least one coil detects the orientation field in a fixed position.

6. The method as claimed in claim 1, wherein detecting the orientation field includes using at least one vehicle-side or fixed sensor coil as the coil provided for inductive excitation.

7. The method as claimed in claim 1, wherein detecting the orientation field includes using the transmission charging coil or receiving charging coil as the coil provided for inductive excitation.

8. The method as claimed in claim 1, wherein:
   the vehicle, the receiving charging coil, or the transmission charging coil is aligned in a predefined optimal relative position,
   the relative position is repeatedly ascertained during alignment, and electric power is transmitted via an alternating magnetic charge field from the transmission charging coil to the receiving charging coil.

9. The method as claimed in claim 8, wherein:
the orientation field and the charge field are generated using the transmission charging coil;
the transmission charging coil generates the orientation field at a first power level, until the at least one coil provided for inductive excitation starts to detect the orientation field;
the transmission charging coil works with less power than the first power level while alignment takes place and after the coil provided for inductive excitation has started to detect the orientation field; and
the charge field is generated by the transmission charging coil at a second power level which lies above the first level, when the optimal relative position is achieved through alignment.

10. The method as claimed in claim 8, wherein the orientation field has a spatial scatter different from that of the charge field.

11. The method as claimed in claim 8, wherein during detecting, during aligning, and/or during charging:
the coil provided for inductive excitation emits a signal examined for discontinuities, or the orientation receiving signal is examined for discontinuities, and
when a discontinuity occurs a signal is emitted, which points to a foreign body.

12. The method as claimed in claim 1, wherein the orientation field is modulated with an identification signal identifying the transmission charging coil.

13. An orientation signal receiver comprising:
at least one coil provided for inductive excitation;
the at least one coil including at least one vehicle-side or fixed sensor coil; and
a receiving device connected to the at least one sensor coil, wherein the receiving device is frequency-selective and is configured to receive an orientation receiving signal from the at least one coil provided for inductive excitation.

14. The orientation signal receiver as claimed in claim 13, wherein the orientation signal receiver comprises at least one resonance circuit comprising the sensor coil as well as a capacity connected thereto, of the frequency-selective receiving device.

15. The orientation signal receiver as claimed in claim 13, wherein the frequency-selective receiving device comprises a filter comprising a passing range, in which a frequency of the orientation field lies, which is adapted to induce the orientation receiving signal in the sensor coil.

16. The orientation signal receiver as claimed in claim 13, further comprising a plurality of sensor coils arranged so as to be inclined towards each other.

17. An inductive charging device for a vehicle, comprising:
an orientation signal receiver comprising:
at least one coil provided for inductive excitation;
the at least one coil including at least one vehicle-side or fixed sensor coil; and
a receiving device connected to the at least one sensor coil, wherein the receiving device is frequency-selective and is configured to receive an orientation receiving signal from the at least one coil provided for inductive excitation
a position calculating device arranged downstream of the receiving device and adapted to ascertain a relative position between the vehicle and a fixed transmission charging coil using the orientation receiving signal of the receiving device; and
an alignment signal generator arranged downstream of the position calculating device and adapted to generate an alignment signal using the relative position of the position calculating device, which signal is configured to be displayed by means of an optical display, or by means of an acoustic or haptic transducer and/or to activate a positioning mechanism of the receiving charging coil or the transmission charging coil.

18. The inductive charging device as claimed in claim 17, further comprising a foreign body detection device arranged downstream of the orientation signal receiver and adapted to ascertain discontinuities in the orientation receiving signal of the receiving device,
wherein an error generator of the foreign body detection device is adapted to emit an error condition signal, if discontinuities are present in the orientation receiving signal.

* * * * *